W. WORKMAN.
Broadcast Seeder
No. 28,934.
Patented June 26, 1860.
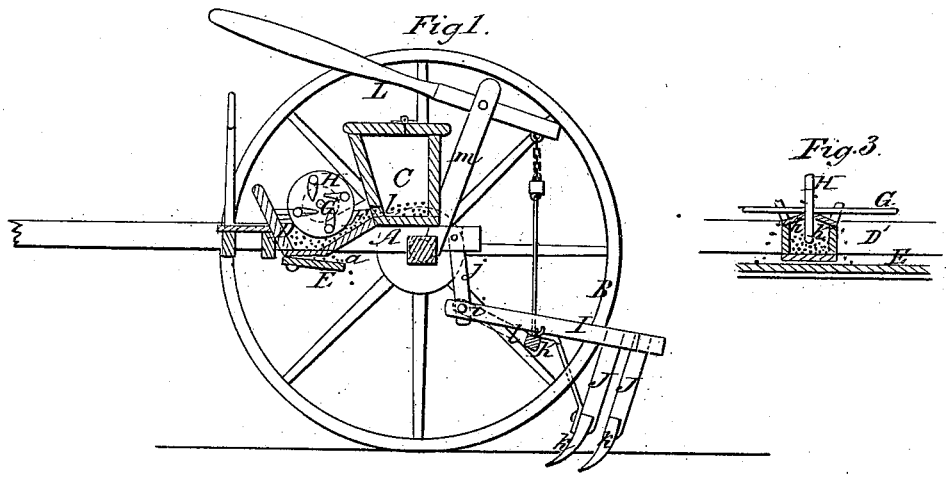
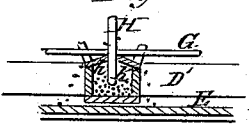
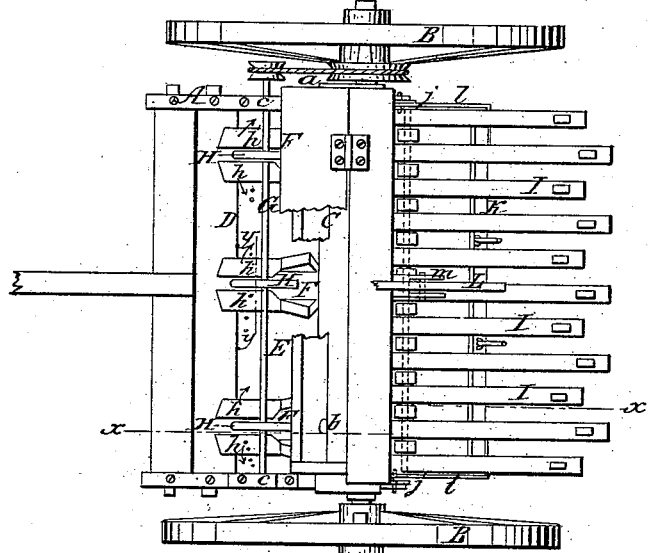
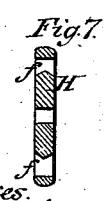
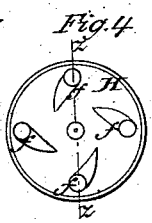
Witnesses.
Inventor.
W. Workman
per Munn & Co.
Attys.

UNITED STATES PATENT OFFICE.

WM. WORKMAN, OF RIPON, WISCONSIN.

IMPROVEMENT IN SEEDING-MACHINES.

Specification forming part of Letters Patent No. 28,934, dated June 26, 1860.

*To all whom it may concern:*

Be it known that I, WILLIAM WORKMAN, of Ripon, in the county of Fond du Lac and State of Wisconsin, have invented a new and Improved Seeding-Machine; and I do hereby declare that the following is a full, clear, and exact description of the same, reference being had to the annexed drawings, making a part of this specification, in which—

Figure 1 is a side sectional view of my invention, taken in the line $x\ x$, Fig. 2. Fig. 2 is a plan or top view of the same. Fig. 3 is a detached transverse section of a portion of the same, taken in the line $y\ y$, Fig. 2. Figs. 4, 5, and 6 are detached views of seed-distributing wheels; and Figs. 7 and 8 are sections of Figs. 4 and 6, taken respectively in the lines $z\ z$, $z'\ z'$.

Similar letters of reference indicate corresponding parts in the several figures.

This invention relates to an improvement in that class of seeding-machines which are designed for sowing seed broadcast.

The object of the invention is to effect an even distribution of the seed by a very simple arrangement of means; and to this end I employ, in connection with a seed box or hopper, a scattering-board and a number of supplemental hoppers communicating with the main or principal one, and provided with seed-distributing wheels and inclined boards, substantially as hereinafter described.

To enable those skilled in the art to make and use my invention, I will proceed to describe its construction and operation.

A is a horizontal frame, which is mounted on two wheels, B B; and C is a seed-box, which is placed on the back part of frame A, the top serving as a seat for the driver. Directly in front of the seed-box C there is a trough, D, the bottom E of which is inclined, and an opening, $a$, is left at the back of the trough for the escape of the seed, the opening $a$ extending the whole length of the trough.

Within the trough D there are placed three or more seed boxes or hoppers, F, which communicate with the main or principal seed-box C by means of openings $b$.

G is a shaft, which is fitted in proper bearings, $c$, on the frame A and extends longitudinally over the trough D. This shaft is rotated by a belt, $d$, from the hub of one of the wheels B, and on the shaft G there are placed seed-distributing wheels H, a wheel H being fitted in each hopper F. The wheels H may be constructed in any suitable way. Seed-cells $e$ may be formed in the sides of the wheels near their peripheries, as shown in Figs. 6 and 8; or openings $f$ may be made entirely through the wheels, as shown in Figs. 4 and 7; or wheels with scoop-shaped arms $g$ may be employed, as shown in Fig. 5.

On the top of each hopper F there are two inclined planes, $h\ h$, inclined in reverse directions and one placed at each side of the wheels, as shown more particularly in Fig. 3.

To the back end of the frame A a rod, $i$, is attached by pendent bars $j\ j$, and on this rod $i$ a series of bars, I, are placed loosely. Each bar I has a foot, J, attached to its back part at or nearly at right angles, and to each foot a cultivator tooth or share, $k$, is secured.

On the ends of the rod $i$ arms $l\ l$ are fitted loosely, and to the outer end of these arms a bar, K, is attached, said bar being connected to a lever, L, the fulcrum of which is in a support, $m$, attached to the seed box or hopper C. The bars I, and consequently the cultivator-teeth $k$, extend the whole length of the trough D.

The operation is as follows: As the machine is drawn along the seed passes from the seed box or hopper C through the openings $b$ into the hoppers F, from which it is raised by the wheels H, the shaft of the latter being rotated by belt $d$, as previously referred to. The seed drops from the wheels H on the inclined planes $h\ h$, and thence on the inclined scatterer or bottom board, E, of the trough D and escapes through the opening $a$, falling in a scattered state on the ground and covered by the teeth $k$.

The teeth $k$ may be elevated above the ground at any time in order that they may pass over obstructions, or for the convenience of turning by depressing the front end of lever L, which may be done by the driver on his seat.

I do not claim separately any of the parts herein described; but,

Having thus described my invention, what I do claim as new, and desire to secure by Letters Patent, is—

The combination of the principal seed-box C, and supplemental seed-boxes F, the latter being provided with the inclined planes $h\ h$ and wheels H, and fitted in the trough D, having the inclined bottom or scattering board, E, as and for the purpose set forth.

WM. WORKMAN.

Witnesses:
PETER B. KISSAM,
L. J. BRAYTON.